United States Patent [19]

Harborne et al.

[11] Patent Number: 4,665,814
[45] Date of Patent: May 19, 1987

[54] IMPACTING NUT CRACKER

[76] Inventors: Eric G. Harborne, Rte. 1 Box 156, Fort Worth, Tex. 76119; William B. Wathen, 2041 Glenco Ter., Fort Worth, Tex. 76110

[21] Appl. No.: 874,090

[22] Filed: Jun. 13, 1986

[51] Int. Cl.⁴ ............................................. A23N 5/00
[52] U.S. Cl. .................................. 99/571; 99/572; 99/577; 99/579
[58] Field of Search ............... 99/568, 571, 572, 573, 99/577, 578, 579, 580, 581–582; 30/120.1, 120.2, 120.3, 120.4, 120.5

[56] References Cited

U.S. PATENT DOCUMENTS

| | | |
|---|---|---|
| 1,049,183 | 12/1912 | White ..................................... 99/579 |
| 1,388,071 | 8/1921 | Simons ................................... 99/579 |
| 1,555,518 | 9/1925 | Ramey . |
| 2,506,822 | 5/1950 | Williamson . |
| 2,577,645 | 12/1951 | Brecheisen ............................. 99/573 |
| 2,642,908 | 6/1953 | Landgraf . |
| 2,707,503 | 5/1955 | Johnson . |
| 3,159,194 | 12/1964 | Anderson . |
| 3,310,083 | 3/1967 | Jennings . |
| 3,473,586 | 10/1969 | Smith . |
| 3,524,486 | 8/1970 | Turner . |
| 3,688,825 | 9/1972 | Hall . |
| 3,795,184 | 3/1974 | Turner .................................... 99/577 |
| 4,441,414 | 4/1984 | Quantz .................................... 99/571 |
| 4,466,343 | 8/1984 | Thompson ............................. 99/572 |
| 4,485,119 | 11/1984 | Price .................................. 99/571 X |
| 4,526,092 | 7/1985 | Greenblatt ............................. 99/575 |

Primary Examiner—Timothy F. Simone
Attorney, Agent, or Firm—Robert A. Felsman

[57] ABSTRACT

An impacting nut cracker which utilizes an impacting plunger activated by a compression spring or electrical solenoid to deliver a sharp blow to an aligned adjustable anvil to provide a stroke of measured distance to a nut confined against a tailstock anvil, the position of which is determined by use of a sector gear and gear rack. A slidable and transparent guard over the impact area prevents excessive dispersion of the fractured shell. A concavity in the tailstock anvil and in the adjustable anvil causes a circular edge to engage each end of the nut to cause circular fractures beneficial in achieving greater uniformity in the fracture pattern of the shell.

9 Claims, 11 Drawing Figures

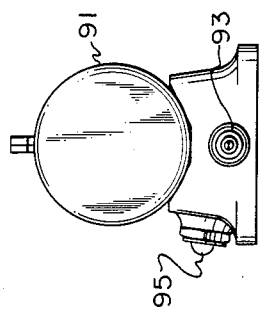
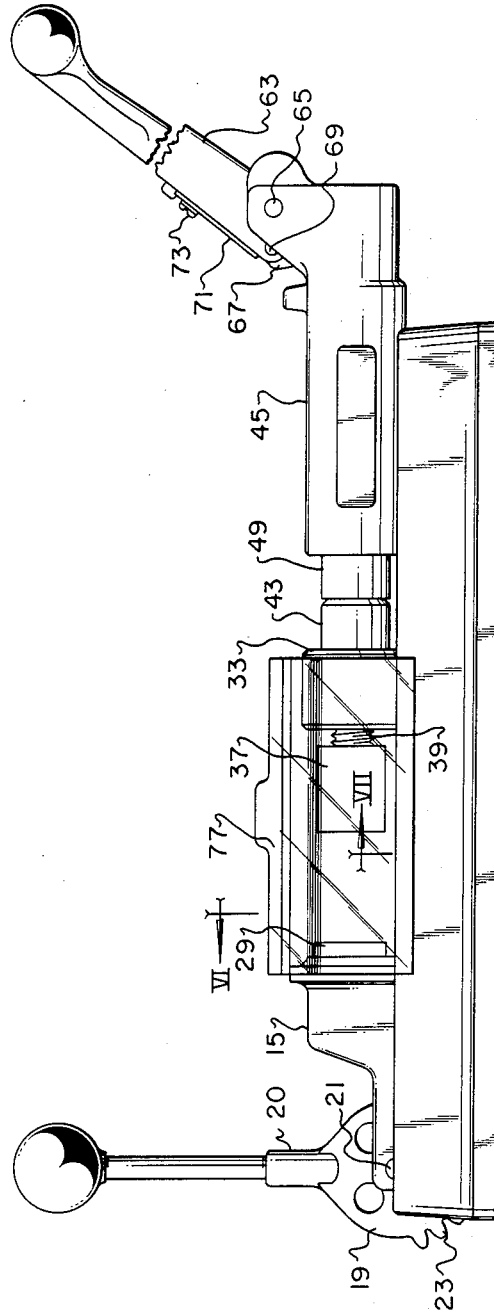
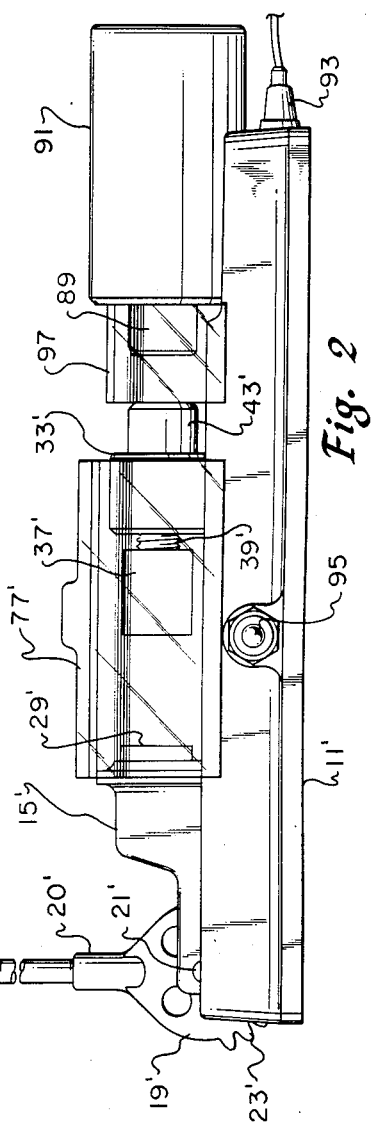

IMPACTING NUT CRACKER

BACKGROUND OF THE INVENTION

1. Field of the Invention

This invention relates in general to those machines especially adapted for semi-automated cracking and shelling of nuts.

2. Description of the Prior Art

There are a wide variety of tools and machines of the past that were devised for removing shells from nuts, such as pecans. Included among the past efforts are machines that use an impacting plunger that delivers a sharp but controlled blow against one end of a shell to shatter it and expose the nut.

Among the semi-automated machines are those which use a spring or solenoid operated plunger to impact the shells of nuts. This type nut cracker includes those having a handle that, when actuated, moves a plunger to compress a spring. A pawl eventually separates the handle from the plunger such that the energy of the compressed spring suddenly releases to drive the plunger into impact with a shell.

There is a persistent challenge for the designers of impacting nut cracking machines. The large variation in the size of nuts and their encapsulating shells—even those of the same specie—demands special precautions. How can the plunger stroke be adjusted to accommodate shells of varying length? Or, how can the force of the impact be varied to provide just the right amount of energy to fracture and remove the shell without substantial damage to the nut, regardless of widely varying thicknessesand nuts? This is the challenge and background that gives rise to the present invention.

SUMMARY OF THE INVENTION

The nut cracker described in this disclosure consists of a heavy base on which is mounted a movable tailstock, a pillow block containing a translating impact plunger, and a headstock incorporating a power plunger operated by a hand lever. In the electrical model the power plunger is replaced by an impacting solenoid.

The tailstock contains a sector gear and a pressure handle plus an anvil that cradles one end of the nut. Movement of the pressure handle takes up slack that might be caused by different nut sizes. Force on the pressure handle results in the nut being held firmly between two anvils. One of the anvils is mounted permanently in the tailstock, the other threads onto an impact plunger that translates back and forth through a pillow block that is rigidly mounted to the base.

The adjustable anvil can be rotated around threads on the impact plunger, thereby varying the length of the impacting stroke which in turn controls the amount of deformation the kernel will experience while the shell is shattering. Once the ideal stroke has been determined for a certain batch of nuts the rest of the batch can be cracked without further adjustment.

A small internal spring applies friction between the adjustable anvil and the impact plunger to keep the stroke adjustment from wandering.

Once the nut has been placed between the two anvils it is snugged tightly between them by movement of the pressure lever. A transparent guard may be moved to cover each nut being cracked by holding the pressure lever stationary while rotating the power lever. The power level and spring loaded plunger are used to impact the nut on the manual model. The electrical model employs an impacting solenoid that replaces the power lever, spring and plunger. Operations of the electric model involves placing the nut between the anvils, sliding the cover over the nut and pressing the solenoid switch button while holding a stationary force on the nut with the pressure handle. The operation is completed on both manual and electric models by sliding the shell containing cover to expose the nut with its cracked shell, releasing the nut by operating the pressure handle and removing the nut with its fractured shell from the device.

DESCRIPTION OF THE DRAWINGS

FIG. 1 is front view of a spring actuated nut cracking machine which embodies the principles of our invention.

FIG. 2 is a front view of an alternate, solenoid operated embodiment of the machine shown in FIG. 1.

FIG. 11 is a view as seen from the right of the alternate embodiment of FIG. 2.

DESCRIPTION OF THE PREFERRED EMBODIMENT

Figure 3:
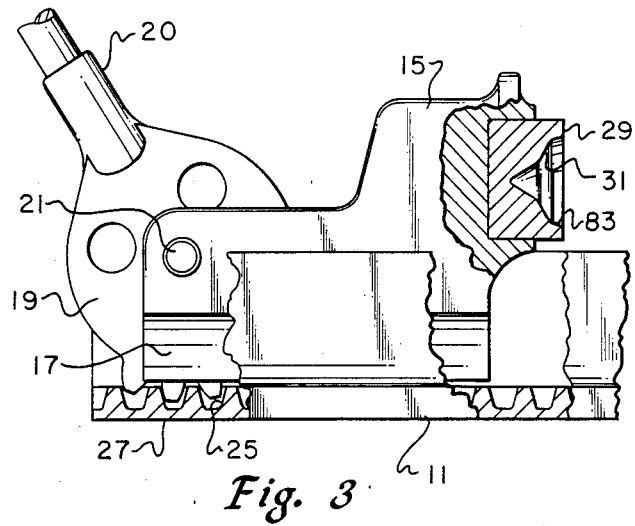
FIG. 3 is a fragmentary and partially sectional view of the left hand portion of the machine shown in FIG. 1 to expose some of the components in better detail.
Figure 4:
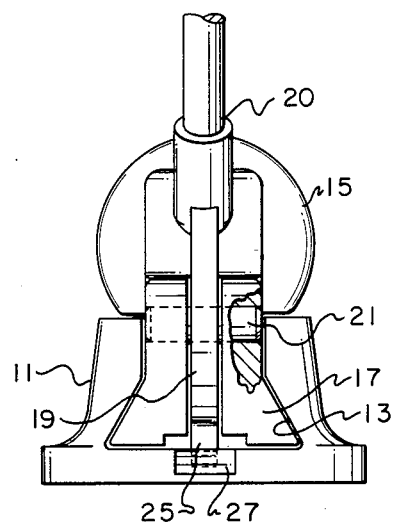
FIG. 4 is a view of the machine as seen from the left in FIG. 1, partially in section.

The numeral 11 of the drawing designates a base having a dovetail 13 (see FIG. 4) that extends lengthwise or longitudinally, one end of which accepts a movable tailstock 15 having a flared lower portion 17 (see FIG. 4) that registers with the dovetail slot 13. Thus, the tailstock 15 is confined to the base 11 but may move reciprocally. Reciprocal movement is achieved with a sector gear 19 pinned to the tailstock 15 with a pin or shaft 21 (see especially FIGS. 3 and 4), movement being achieved by engagement and movement of the sector gear teeth 23 along registering teeth 25 (see FIG. 3) of a gear rack 27. A tailstock anvil 29 has a concavity 31 adapted to engage one end of a shell which encapsulates a nut to provide enhanced fracturing as will be explained more fully hereinafter. The sector gear 19 is actuated with a handle 20 to enable selected reciprocal movement of the tailstock and tailstock 15 anvil 29.

Figure 8:
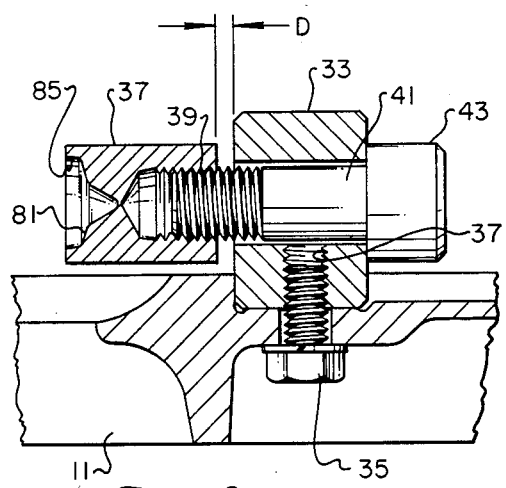
FIG. 8 is a fragmentary and partially sectional view of the impacting plunger and adjustable anvil shown in FIG. 1.

A pillow block 33 is rigidly mounted to the base 11 by a machine screw 35 that engages the threads 37 (see especially FIG. 8). The pillow block 33 retains an adjustable anvil 37 mounted by threads 39 to one end of an impacting plunger 41 having an enlarged head 43. Thus, the stroke of impacting plunger is adjusted to a selected amount D.

Figure 5:
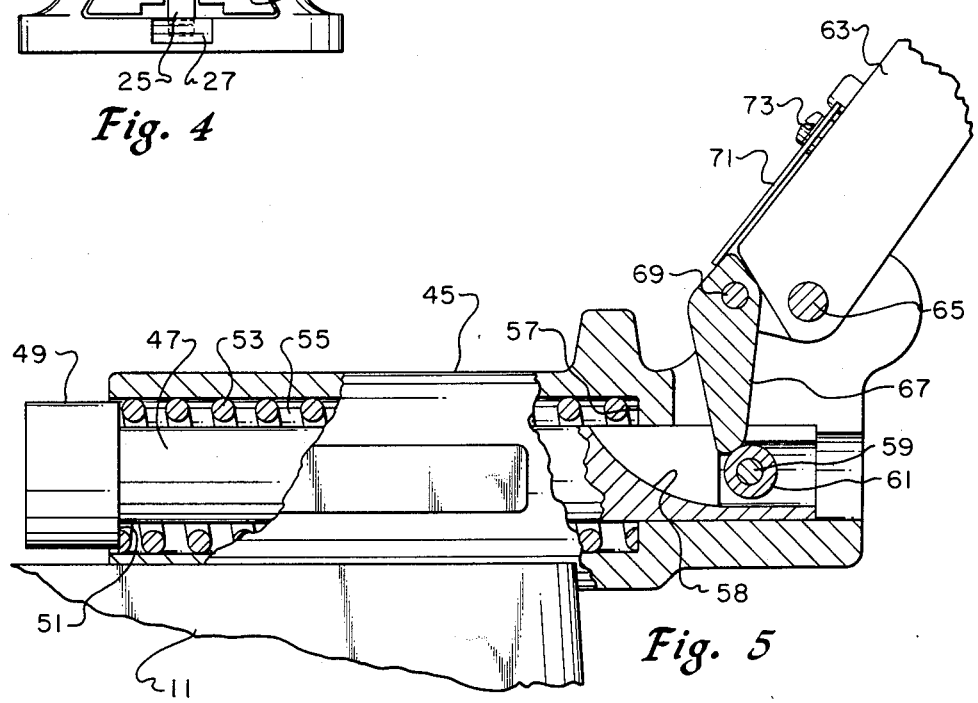
FIG. 5 is a fragmentary and partially sectional view of the right hand portion of the machine shown in FIG. 1.
Figure 6:
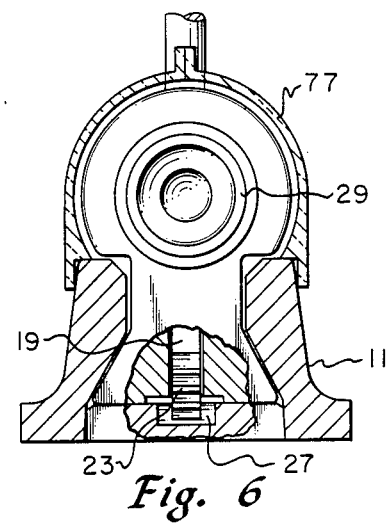
FIG. 6 is a cross sectional view as seen looking along the lines VI—VI of FIG. 1.

Also mounted to base 11 is a headstock 45 which, as best seen in FIG. 5, forms a housing for a spring loaded power plunger 47 that also has an enlarged head 49 adapted to oppose and engage the enlarged head 43 of the impacting plunger, the two plungers bineg homocentric. An internal shoulder 51 of enlarged head 43 is engaged by one end of a coil spring 53 mounted in an annular space 55 between the power plunger 47 and the headstock 45, the opposite end of the spring being adapted to engage a shoulder 57 in the headstock.

Mounted crosswise within a slot 58, in one end of the power plunger 47 by a pin 59, is a roller 61. The power plunger 47 is moved to the right as viewed in FIG. 5 by counterclockwise motion of a power handle 63, confined by a pin 65 to the heatstock by engagement of a pawl 67 with the roller 61. The pawl is adapted to move clockwise past the roller 61, being rotatably mounted by a pin 69 against one end of a flat spring 71 retained by screw 73 to the power handle 63.

Figure 7:
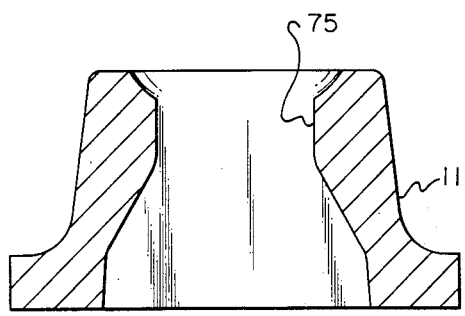
FIG. 7 is a cross sectional view as seen as looking along the lines VII—VII of FIG. 1.

As shown in FIG. 7 the central portion of the base 11 has a trough 75 located in approximately the region where shells are fractured to collect fragments. Also, a sliding transparent cover 77, as shown in FIG. 1, is adapted to move over the region where shells are fractured to prevent unwanted dispersion.

Figure 9:
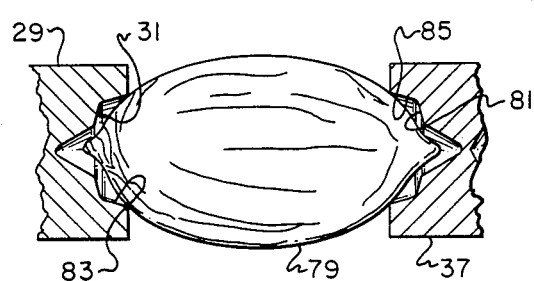
FIG. 9 is a view of a pecan confined between the tailstock and special anvils of FIG. 1.

In FIG. 9 is shown a portion of the tailstock anvil 29 which receives one end of a pecan 79 in a concavity 31. A similar concavity 81 is formed in the adjustable anvil 37, each concavity 31, 81 having a circular edge 83, 85 which, upon impact, causes a circular fracture similar to that designated by the numeral 87 in FIG. 10.

Figure 10:
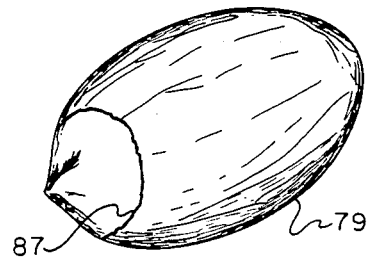
FIG. 10 is a perspective view of a pecan having a circumferential fracture achieved with the invention.

In operation, a shell encased pecan such as 79 in FIG. 10 is positioned between the tailstock anvil 29 and adjustable anvil 37, the position of which is adjusted to a selected distance D (FIG. 8).

Then the pressure handle 20 is moved clockwise as seen in FIG. 1 until the pecan 79 is retained between the tailstock anvil 29 and the adjustable anvil 37. Simultaneous, the power handle 63 is moved to retract the spring loaded plunger 47 against coil spring 53 until eventually the pawl 67 slips past the roller 61 (FIG. 5). This releases the coil spring 53 to drive the power plunger 47 such that a sharp impact is transmitted through the enlarged head 49 against the enlarged mating head 43 of the impacting plunger 41. Thus, a sharp impact is generated at each end of the pecan 79 through the circular edges 83, 85 of tailstock anvil 29 and adjustable anvil 37. It may be seen that the rotation of the adjustable anvil 37 about the impacting plunger 41 controls the length of the stroke of this plunger.

Because the adjustable anvil 37 and the opposed tailstock anvil 29 cradle a nut and its shell between identical sockets designed to give each end of the nut a circular crack, greater consistency is achieved. The special configuration of the concavities 31, 81 of the tailstock anvil 29 and adjustable anvil 37 produce the circular fracture 87 shown in FIG. 10 on each end of the shell. When the length of the stroke is adjusted properly, the nut will experience several longitudinal cracks in addition to the circular ones.

An alternate embodiment of the invention is shown in FIGS. 2 and 11, which is identical to that of FIG. 1 in having a base 11' to support a tailstock 15', a sector gear 19' and a handle 20', all of which are used to position the tailstock anvil 29'. An adjustable anvil 37' confined by pillow block 33' positions an enlarged head 43' of an impact plunger, to be impacted in this instance by an armature 89 of an electrical solenoid 91 energized through the electrical conductors 93 and switch 94. Here also the sliding transparent cover 77' is utilized, and in addition a guard 97 over armature 89.

In the FIG. 1 embodiment a spring loaded power plunger head 49 is utilized to deliver a sharp blow to the head 43 of an impacting plunger. In the FIG. 2 embodiment the headstock is replaced with the electrically operated solenoid 91 such that the armature 89 delivers a sharp blow to the head 43 of the impacting plunger. Otherwise, the operation of the devices is identical.

While the invention has been described in only two of its forms, it should be apparent to those skilled in the art that it is not thus limited, but is susceptible to various changes and modifications without departing from the spirit thereof.

We claim:

1. An improved nut cracking machine which comprises:
   a base;
   a movable tailstock reciprocally retained on one region of the base;
   a handle operated gear means connecting the base and the tailstock to enable selective positioning thereof;
   a tailstock anvil secured to an inner end of the tailstock;
   an axially adjustable impacting plunger reciprocally carried by the base and having an anvil shaped end to confine a shell encased nut against the tailstock anvil;
   a power plunger reciprocally carried by the base for delivering a sharp blow to the impacting plunger and the shell of the nut.

2. The invention defined by claim 1 wherein the power plunger further comprises:
   a compression spring engaging and biasing the power plunger; and
   a handle operated pawl and roller for moving the power plunger against the spring and then releasing the spring to generate an impact against a nut.

3. The invention defined by claim 1 wherein the power plunger is operated by an electrical solenoid.

4. An improved nut cracking machine which comprises:
   a base;
   a movable tailstock reciprocally retained on one region of the base;
   a handle operated section gear carried by the base and engaging a gear rack on the base to enable selective positioning of the movable tailstock;
   an axially adjustable impacting plunger reciprocable carried by the base;
   an axially adjustable anvil secured to one end of the impacting plunger to confine a shell encased nut against the tailstock and to determine the stroke length of the impacting plunger;
   a power plunger reciprocable carried by the base for delivering a sharp blow to the impacting plunger and the shell of the nut when retained between the tailstock anvil and the adjustable anvil.

5. The invention defined by claim 4 wherein the power plunger further comprises:
   a compression spring engaging and biasing the power plunger; and
   a handle operated pawl and roller for moving the power plunger against the spring and then releasing the spring to generate an impact against a nut.

6. The invention defined by claim 4 wherein the power plunger is operated by an electrical solenoid.

7. An improved nut cracking machine which comprises:
- a base;
- a movable tailstock reciprocally retained on one region of the base;
- a handle operated sector gear carried by the base and engaging a gear rack on the base to enable selective positioning of the movable tailstock;
- a handle operated sector gear carried by the base and engaging a gear rack on the base to enable selective positioning of the movable tailstock;
- a tailstock anvil secured to an inner end of the tailstock;
- an impacting plunger reciprocally carried by the base;
- an adjustable anvil secured to one end of the impacting plunger to confine a shell encased nut against the tailstock and to determine the stroke length of the impacting plunger;
- a power plunger reciprocally carried by the base for delivering a sharp blow to the impacting plunger and the shell of the nut when retained between the tailstock anvil and the adjustable anvil;
- the tailstock and the adjustable anvils each having a concavity with a substantially circular edge to engage the shell and cause circular fractures.

8. The invention defined by claim 7 wherein the power plunger further comprises:
- a compression spring engaging and biasing the power plunger; and
- a handle operated pawl and roller for moving the power plunger against the spring and then releasing the spring to generate an impact against a nut.

9. The invention defined by claim 7 wherein the power plunger is operated by an electrical solenoid.

* * * * *